Jan. 20, 1970  B. T. BUZALSKI  3,490,855
PHOTOFLASH LAMP HAVING AN IMPROVED COLOR
TEMPERATURE CHARACTERISTIC
Filed Jan. 8, 1968

WITNESSES:
Helen M. Harkas
Walter Sutcliff

INVENTOR
Bruce T. Buzalski
BY
W.D. Palmer
ATTORNEY

3,490,855
PHOTOFLASH LAMP HAVING AN IMPROVED COLOR TEMPERATURE CHARACTERISTIC

Bruce T. Buzalski, Dover, N.J., assignor to Westinghouse Electric Corporation, Pittsburgh, Pa., a corporation of Pennsylvania
Filed Jan. 8, 1968, Ser. No. 696,356
Int. Cl. F21k 5/02
U.S. Cl. 431—95         5 Claims

ABSTRACT OF THE DISCLOSURE

A photoflash lamp generates increased light output having an improved color temperature characteristic while retaining a rapid time-to-peak and short-duration light output characteristic. This is accomplished by employing a combustible comprising a combination of different metals formed as intimately contacting elongated thin strands. The different combustible metals are chosen because of their individual combustion characteristics.

BACKGROUND OF THE DISCLOSURE

Photoflash lamps now in use generally employ shredded combustible metals such as zirconium or aluminium as the flash producing material. These metals burn at varying rates to produce an intense flash of light for photographic applications. Some photographic applications require a flash lamp which produces a rapid time-to-peak and short-duration light characteristic. This is generally achieved by utilizing zirconium metal as the flash material. Another important design characteristic in photoflash lamps, especially for use in color photography is the color temperature characteristic of the light which the flash material produces upon combustion. The color temperature is a light characteristic which indicates the relative value of temperature at which an ideal black body emits radiant energy evoking a color response of an illuminated subject of the same hue and saturation as evoked by radiant energy from a given source. This color temperature characteristic is important in relation to the color temperature characteristic of daylight. The color temperature characteristic associated with outdoor daylight conditions is about 6000° K. and so-called outdoor photographic films are adapted to respond to these conditions. When the same film is sought to be used indoors with artificial lighting the response at even high levels of illumination will be quite different because of the much lower color temperature characteristic produced by artificial lighting sources. Photoflash lamps in which shredded aluminum is used as the flash producing material exhibit a color temperature characteristic of about 3800° K. while similar lamps using zirconium metal have a color temperature characteristic of about 4100° K. These color temperature values are for a size AG-1 lamp with standard oxygen fill and foil dimensions. These lamps are generally coated with a blue lacquer to improve the color temperature characteristic. This lacquer, however, also absorbs light and thereby reduces the total level of illumination.

Magnesium is known in the art as a metal which upon combustion in a photoflash lamp emits light having a high color temperature characteristic. In general, however, magnesium photoflash lamps exhibit a very poor time-to-peak and duration characteristic for the emitted light. Alloys of zirconium and magnesium have also been employed as the combustible means in photoflash lamps. Lamps using alloys of these metals have not been able to combine a high color temperature characteristic with a rapid time to peak and short duration characteristic that is desired in a commercial photoflash lamp. Lamps have also been produced containing mixtures of shredded metal foils cut at varying widths depending on the rate of combustion of the metals used. The overall effect in such lamps is to increase the color temperature to a degree but this is accompanied by a relatively long duration time of flash and this is generally unacceptable commercially.

SUMMARY OF THE INVENTION

It is an object of this invention to provide an improved photoflash lamp exhibiting a generally higher level of illumination and exhibiting a superior color temperature characteristic, while retaining a rapid time-to-peak light output and short-duration light output characteristic.

This object and others which will be apparent as the description proceeds are achieved by providing an improved photoflash lamp in which at least a substantial portion of the combustible metal filling comprises elongated strands each comprising at least two individual metallic members bonded together. The individual metals are selected for their individual combustion characteristics. One of the metals is selected to react in rapid fashion with the oxygen atmosphere upon being ignited by the ignition means. The other metal is chosen to be ignited primarily by the ignition of the rapid reacting metal and to produce actinic light of a high color temperature characteristic upon ignition in the oxygen atmosphere of the lamp.

DESCRIPTION OF THE PREFERRED EMBODIMENT

Figure 1:
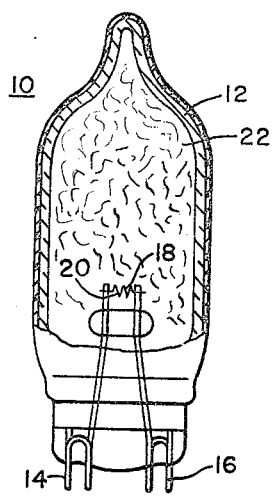
FIG. 1 is a view of an elevation of an embodiment of the photoflash lamp of the invention.

The invention can best be explained by reference to the specific embodiment. In FIG. 1, a photoflash lamp 10, by way of example an AG-1 type lamp, comprises a vitreous light transmitting sealed envelope 12, of a material such as glass. The conductive lead-ins 14 and 16 are sealed through the envelope and are internally connected via the ignition filament 18. The filament 18 is coated with a primer material 20 which is typically powdered zirconium mixed with potassium perchlorate and a binder. The lead-ins 14, 16 are externally adapted to be connected to an electrical energy source for igniting the lamp. The envelope encloses an oxygen atmosphere at about five atmospheres pressure. The combustible metal filling 22 is present in an amount of about 28 mg. for the AG-1 size bulb.

Figure 2:
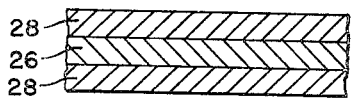
FIG. 2 is an enlarged fragmentary view in cross-section of the combustible flash material used in the preferred lamp embodiment.
Figure 3:
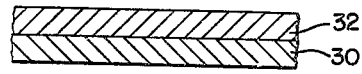
FIG. 3 is an enlarged fragmentary view in cross-section of another embodiment of the combustible flash material.
Figure 4:
FIG. 4 is an enlarged fragmentary view of still another embodiment, in cross-section, of the combustible flash material.

The metal filling 22 is preferably comprised of elongated strands comprising at least two individual metallic members bonded together as shown in the emboidments in FIG. 2, FIG. 3, and FIG. 4. In the preferred embodiment shown in FIG. 2 a sheet of magnesium foil 26 approximately 0.33 mil thick has a 0.33 mil thick layer 28 of zirconium metal intimately bonded to each side of the foil 26. This intimate bonding can be carried out by vacuum metalizing the zirconium onto the magnesium sheet in an evacuated chamber. Vacuum metalizing allows for accurate control of the thickness of the layer deposited as well as providing intimately contacting metal layers. The thin layers of metal can also be joined together by cold rolling the individual metal layers together or other laminating techniques which achieve intimate contact between the metallic members.

The resulting thinly layered metallic member is cut and shredded using conventional techniques. The shredded material is incorporated into a standard photoflash lamp envelope in a predetermined amount dependent on the size of the photoflash lamp. The photoflash lamp is then filled with oxygen, in the size AG–1 lamp the oxygen is at a pressure of about 5 atmospheres.

In the embodiments shown in FIG. 3 a thin layer 30 of zirconium is bonded to a thin layer of magnesium 32. The thickness of the layers can be varied to control the desired characteristics of the light output. By way of example the zirconium layer 30 can be 0.5 mil thick and the magnesium layer 32 about 0.25 mil thick. A predetermined amount of the shredded material is incorporated into a particular size photoflash lamp.

In yet another embodiment as shown in FIG. 4, a magnesium core 34 is contained within a filamentary casing 36 of zirconium. Again by way of example the magnesium core is about 0.33 mil in diameter, and the zirconium casing 36 thereabout is about 0.33 mil thick. A predetermined amount of the material is incorporated into a particular size photoflash lamp by bunching the material substantially uniformly within the space enclosed by the envelope.

Other metals exhibiting a high color temperature characteristic upon combustion such as thorium can be substituted for the magnesium in the examples given above. The zirconium can be substituted for by aluminum for use with either magnesium or thorium.

The time to peak characteristic for the lamp described above is designed to be substantially the same as that observed for a pure zirconium filled size AG–1 lamp which exhibits a time to peak of about 8 to 12 milliseconds depending on the oxygen fill and the shred size. The time in which a brightness level of ½ of peak output is sustained in a conventional zirconium-filled lamp is about 15 milliseconds. Again the lamp described above with a zirconium member bonded with magnesium member is designed to have a duration of intensity for one-half peak intensity of about 15 milliseconds. The time to peak and duration characteristics are several milliseconds longer for an aluminum filled size AG–1 lamp.

In specifying a color temperature characteristic for a particular metal this parameter will be dependent on the particular lamp parameters. Lamps utilizing magnesium as the combustible are known to produce light exhibiting a color temperature characteristic greater than 5000° K. Similarly a photoflash lamp with thorium as the combustible can be expected to produce light having a color temperature characteristic of up to about 5000° K.

The photoflash lamps described in the examples produce actinic light with a high color temperature characteristic, a very rapid time to peak light output, and a short duration light output characteristic. The lamp may be coated with a blue lacquer to further increase the color temperature characteristic. While the use of the blue lacquer would decrease the overall light output, the density of the lacquer layer required with the present lamp is minimized so that for light having comparable color temperature characteristics the present lamp with a less dense lacquer coating exhibits higher light output.

The relative thickness of the particular metallic members can be varied to alter the light output characteristics as well as the combustion rate for a particular lamp.

In the embodiments utilizing thorium as a core metal an additional desirable effect is accomplished in that the zirconium coating acts as an encompassing shield for the thorium metal which is radioactive to a degree thereby minimizing radiative problems.

It will be recognized that there has been provided a photoflash lamp combination which achieves a light output exhibiting a high color temperature characteristic and also a rapid time-to-peak light output and short-duration light output characteristic. A thin blue lacquer coating can be utilized on the outer envelopes to further increase the color temperature characteristic. However, the thicknesss of the lacquer coating is minimized to allow for a greater general overall light output.

There have been illustrated and described specific metals in the examples illustrating the invention. The individual metallic members need not be pure individual metals and are selected so that the ignition of the more reactive and rapidly burning member controls the ignition rate of the second metallic member which is a material which exhibits a high color temperature characteristic. It should be understood that different combinations of metals or alloys thereof may be selected and combined within the teaching of the present invention.

While the invention has been described with respect to a specific lamp size and specific amounts of cumbustion material, it is to be understood that the invention is not to be limited thereto or thereby.

I claim as my invention:

1. A photoflash lamp comprising a light transmitting envelope, an oxygen atmosphere at a predetermined pressure enclosed by said envelope, ignition means supported within said envelope and adapted to be ignited to produce a limited combustion reaction, and a predetermined amount of elongated strands of combustible metal enclosed by said envelope, at least a substantial portion of said combustible metal strands comprising:
   (a) at least two individual intimately contacting metallic members bonded together along the length of said elongated strands;
   (b) at least one of said individual metallic members adapted to react with said oxygen atmosphere when ignited by said ignition means to burn at a very rapid and predetermined rate; and
   (c) the other of said metallic members being ignited primarily by the ignition of said very rapid burning metallic member, said other metallic member producing actinic light of a high color temperature characteristic upon ignition in said oxygen atmosphere.

2. The lamp as specified in claim 1, wherein said other metallic member is an elongated thin layer of magnesium, and said very rapid burning metallic member comprises individual layers of zirconium bonded on each side of said magnesium layer.

3. The lamp as specified in claim 1, wherein said elongated strands comprise a thin layer of zirconium bonded to a thin layer of magnesium.

4. The lamp as specified in claim 1, wherein said elongated strands comprise a core of magnesium within a filamentary metallic casing of zirconium.

5. The lamp as specified in claim 1, wherein said envelope has a thin blue lacquer coating thereon to further increase the color temperature characteristic of the actinic light transmitted.

References Cited

UNITED STATES PATENTS 3,303,674    2/1967    Anderson _____ 431—95

FOREIGN PATENTS 142,529    7/1951    Australia.

CHARLES J. MYHRE, Primary Examiner